(12) United States Patent
Andersson et al.

(10) Patent No.: US 7,495,599 B2
(45) Date of Patent: Feb. 24, 2009

(54) SIMULTANEOUS DUAL POLARIZATION RADAR SYSTEM WITH PEDESTAL MOUNTED RECEIVER

(75) Inventors: Henry Andersson, Espoo (FI); Petri Haapanen, Vantaa (FI); Pentti Karhunen, Vantaa (FI); Reino Keränen, Espoo (FI); Jarkko Korte, Espoo (FI); Timo Lyly, Helsinki (FI); Olli-Pekka Marstio, Pornainen (FI); Pauli Niska-Pudas, Helsinki (FI); Juha Salmivaara, Kerava (FI); Elena Saltikoff, Helsinki (FI); Rainer Sanmark, Helsinki (FI); Paavo Toppila, Vantaa (FI)

(73) Assignee: Vaisala Oyj, Helsinki (FI)

( * ) Notice: Subject to any disclaimer, the term of this patent is extended or adjusted under 35 U.S.C. 154(b) by 0 days.

(21) Appl. No.: 11/885,272

(22) PCT Filed: May 17, 2006

(86) PCT No.: PCT/FI2006/000158

§ 371 (c)(1),
(2), (4) Date: Aug. 29, 2007

(87) PCT Pub. No.: WO2006/125851

PCT Pub. Date: Nov. 30, 2006

(65) Prior Publication Data

US 2008/0165052 A1 Jul. 10, 2008

(30) Foreign Application Priority Data

May 23, 2005 (FI) .................... 20050544

(51) Int. Cl.
*G01S 13/95* (2006.01)
(52) U.S. Cl. .................. 342/26 R; 342/175; 342/188; 342/26 D
(58) Field of Classification Search .............. 342/26 R, 342/26 A–26 D, 99–100, 173–175, 188
See application file for complete search history.

(56) References Cited

U.S. PATENT DOCUMENTS

| | | | |
|---|---|---|---|
| 5,093,662 A | | 3/1992 | Weber |
| 5,500,646 A | * | 3/1996 | Zrnic .......................... 342/188 |
| 5,793,334 A | * | 8/1998 | Anderson et al. ........... 343/786 |
| 6,061,013 A | * | 5/2000 | Sauvageot et al. ......... 342/26 R |
| 6,473,026 B1 | * | 10/2002 | Ali-Mehenni et al. ..... 342/26 R |
| 7,049,997 B2 | * | 5/2006 | Alford et al. ............... 342/26 R |
| 2004/0056791 A1 | | 3/2004 | Alford et al. |
| 2005/0093734 A1 | * | 5/2005 | Alford et al. ............... 342/26 R |
| 2008/0084357 A1 | * | 4/2008 | Smeltzer ..................... 343/757 |
| 2008/0165052 A1 | * | 7/2008 | Andersson et al. ........ 342/26 R |

FOREIGN PATENT DOCUMENTS

WO    WO 2006035109 A1 *  4/2006

* cited by examiner

*Primary Examiner*—John B Sotomayor
(74) *Attorney, Agent, or Firm*—Birch, Stewart, Kolasch & Birch, LLP

(57) ABSTRACT

The present invention relates to a method and apparatus for simultaneous transmission of horizontal (H) and vertical (V) channels in a dual polarized weather radar. The goal of the invention is accomplished by placing the receiver, duplexer and polarizer equipment above the azimuth rotary joint but below elevation rotary joints. The elevation rotary joints and other associated signal paths are calibrated by using a low power signal on the radar's operating frequency that is fed into couplers above the elevation rotary joints.

2 Claims, 3 Drawing Sheets

SIMULTANEOUS DUAL POLARIZATION RADAR SYSTEM WITH PEDESTAL MOUNTED RECEIVER

The invention relates to a method according to the preamble of claim 1 to arrange receiver, duplexer and polarizer equipment in a simultaneously transmitting dual polarization radar.

The invention relates also to an method and apparatus for calibration of elevation rotary joints and associated signal paths in a simultaneously transmitting dual polarized weather radar.

In the prior art solutions dual rotary joints are used in azimuth and elevation. In other prior art solutions receiver, duplexer and polarizer are placed above the elevation rotary joint It is an object of the present invention to overcome the drawbacks of the above-described techniques and to provide an entirely novel type of method and apparatus for simultaneous transmission and calibration of H- and V-channels in a dual polarized weather radar The goal of the invention is accomplished by placing the receiver and polarizer equipment above the azimuth rotary joint but below elevation rotary joints. The elevation rotary joints and other associated signal paths are calibrated by using a low power signal on the radar's operating frequency that is fed into couplers above the elevation rotary joints.

More specifically, the method according to the invention is characterized by what is stated in the characterizing part of claims 1.

Figure 1:
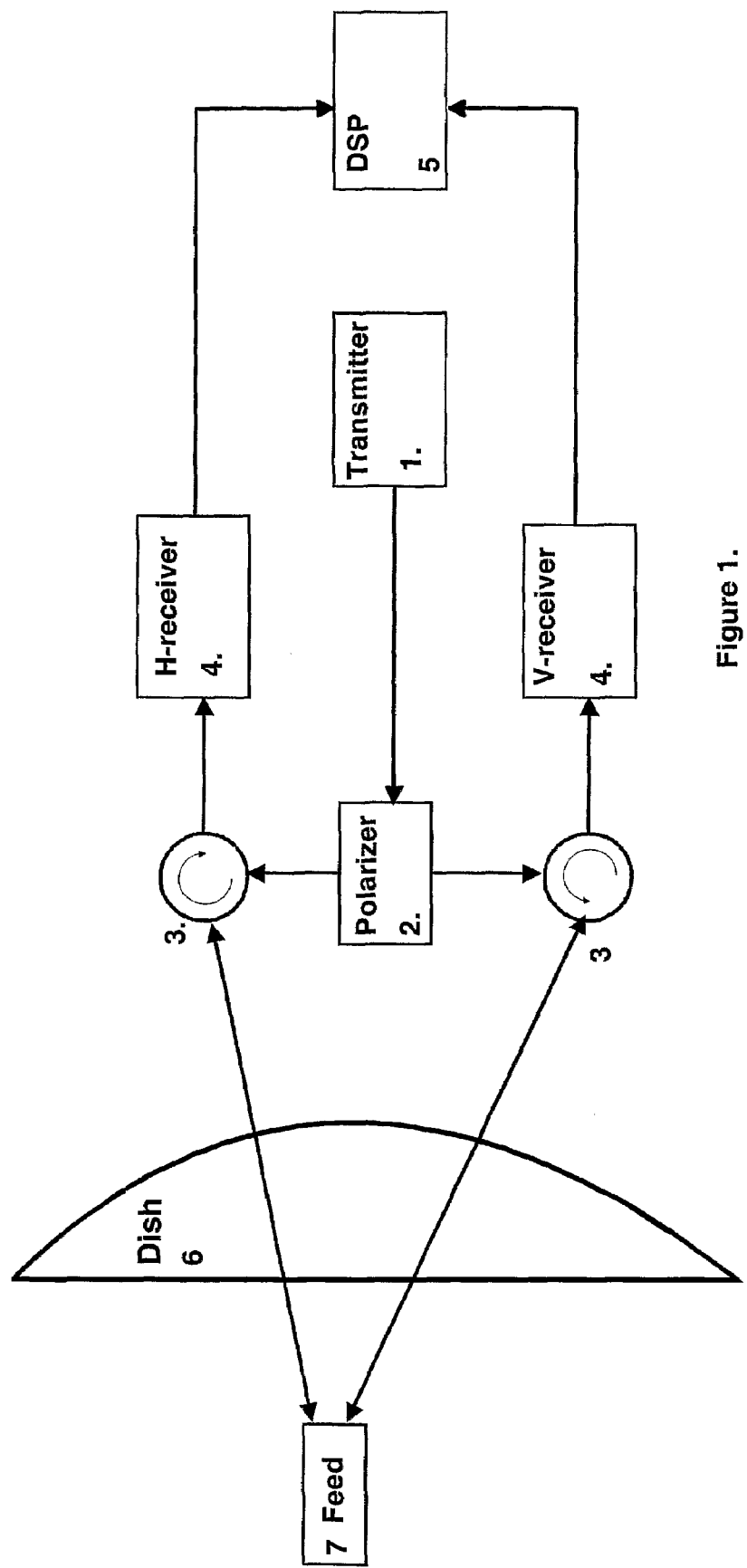

In the following the invention is described in greater detail with the help of exemplifying embodiments illustrated in the appended drawings in which FIG. 1 shows the basic principle of a state of the art dual polarized weather radar (see reference 1).

Transmitter 1 output is directed to one or both of duplexers 3 by a polarizer 2 that splits the signal into horizontal (H) and vertical (V) components. Depending on mode of operation of the radar the H- and V-components are sent alternately or simultaneously.

From duplexers the H- and V-components of the signal are directed to orthomode feed 7 and directed to atmosphere by dish reflector 6.

On reception the H- and V-components are separated by the orthomode feed 7 and directed by duplexers 3 to H-channel and V-channel 4 of radar receiver and processed further by signal processor DSP 5.

Figure 2:
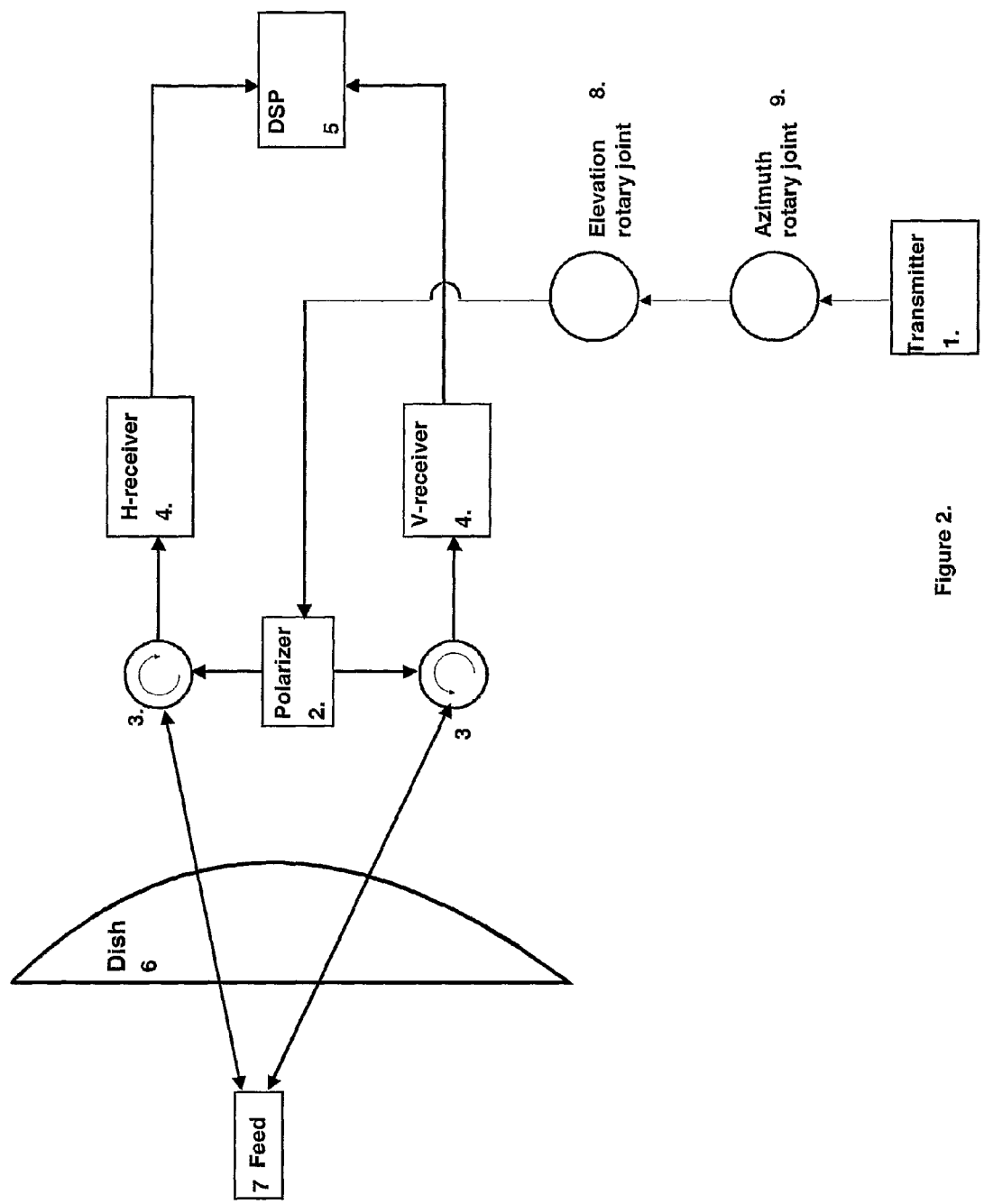

FIG. 2 shows principle of one radar design based on the above mentioned principle where receiver, duplexer and polarizer are placed above the elevation rotary joint (see reference 2 and 3).

Transmitter 1 output is directed in a waveguide through azimuth rotary joint and elevation rotary joint to one or both of duplexers 3 by a polarizer 2 that splits the signal into horizontal (H) and vertical (V) components.

From duplexers the H- and V-components of the signal are directed to orthomode feed 7 and directed to atmosphere by dish reflector 6.

On reception the H- and V-components are separated by the orthomode feed 7 and directed by duplexers 3 to H-channel and V-channel 4 of radar receiver and processed further by signal processor DSP 5.

In this design the duplexers 3, the polarizer 2, the receivers 4 and the DSP 5 are located above the elevation rotary joint to avoid dual rotary joints for H- and V-polarizations. This design, however causes the receiver and DSP parts to be subject to mechanical vibrations and makes placing of various components unnecessary complicated.

Figure 3:
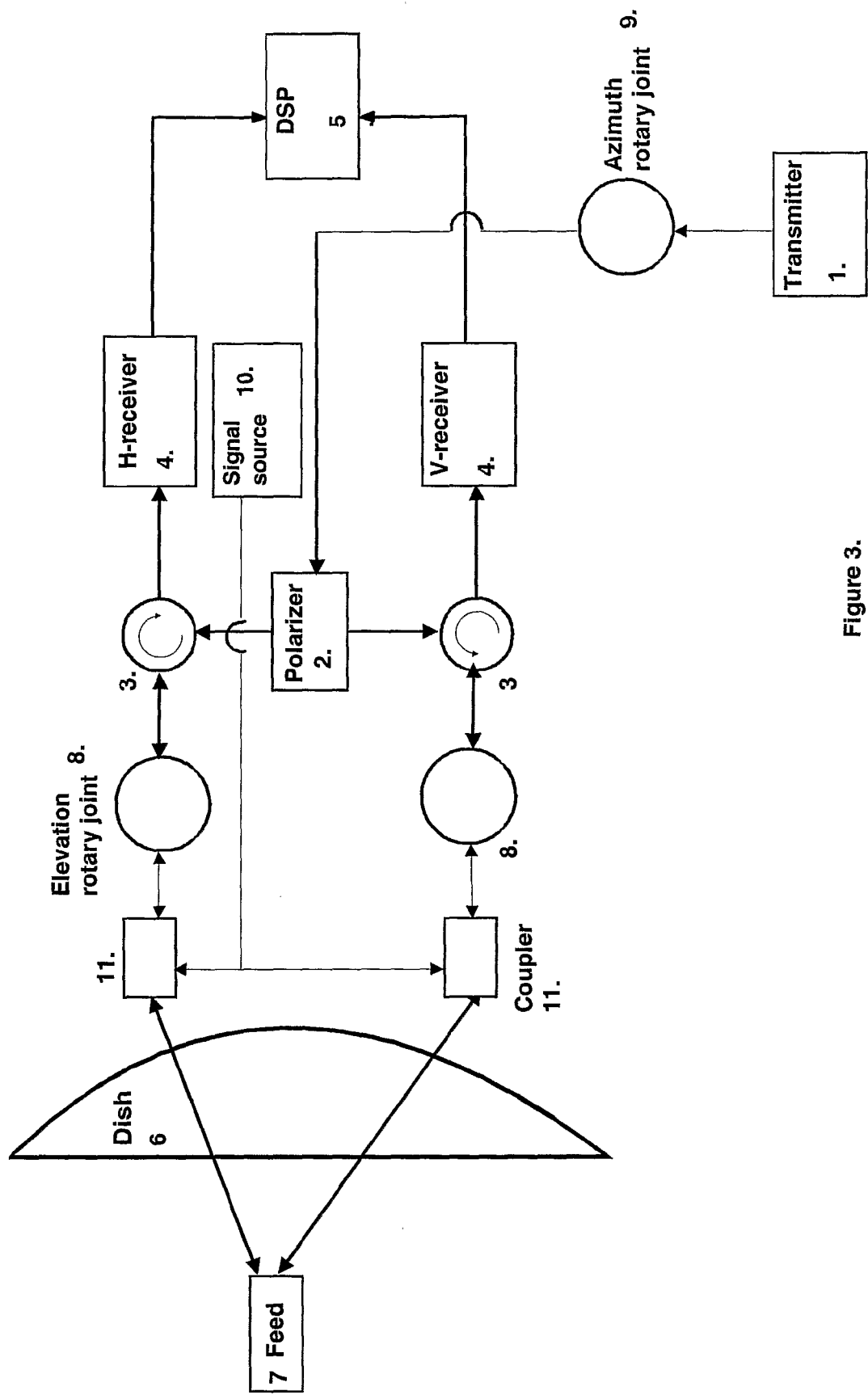

FIG. 3 shows a principle of a radar design that avoids the mechanical problems of reference 2 and 3 and also avoids the problems associated with dual rotary joints.

The transmitter 1 output is directed in a waveguide through an azimuth rotary joint 9 to one or both of duplexers 3 by a polarizer 2 that splits the signal into horizontal (H) and vertical (V) components.

From duplexers the H- and V-components of the signal are directed through two separate single elevation rotary joints 8 to an orthomode feed 7 and directed to atmosphere by a dish reflector 6. A dual joint could also be used in elevation with its associated problems.

On reception the H- and V-components are separated by the orthomode feed 7 and directed through elevation rotary joints 8 by duplexers 3 to H-channel and V-channel 4 of radar receiver and processed further by signal processor DSP 5.

In this design the duplexers 3, the polarizer 2, the receivers 4 and the DSP 5 are located above the azimuth rotary joint 9 but below elevation rotary joints 8. This design avoids most problems associated with mechanical vibrations and also avoids use of dual rotary joints.

Using two separate elevation rotary joints or a dual elevation rotary joint may cause some difference in phase and amplitude of the H- and V-signals. This can be compensated in real time or by calibrating the joints as a maintenance operation.

FIG. 3 shows as a block diagram of the calibration arrangement using a signal source placed in the pedestal. This arrangement is a variation of the calibration method using a separate calibration antenna (See reference 4.)

A low power calibration signal on the radar's operating frequency locked to the master oscillator of the radar system is taken from the signal source 10 and split into couplers 11 above the elevation rotary joints 8 and fed into receivers 4.

The low power calibration signal can be pulsed and its pulse repetition frequency can be chosen to be same as pulse repetition frequency of the radar's high power transmission but continuous wave signal can as well be used if high power transmission is blocked during calibration.

When pulsed calibration signal is used, transmission of calibration and high power signals are synchronized so that the calibration signal is received instead of atmospheric echo on a chosen range gate on which a strong atmospheric echo is not present. Thus a real time pulse by pulse calibration is achieved which is capable to compensate very rapid changes in signal paths.

The calibration signals are received by H- and V-channels 4, 5 of the radar receiver as in normal operation of the radar and differences between the channels are observed.

Differences between the channels are used as calibration information to remove distortion effects of the rotary joints or any other factors of the signal paths.

REFERENCES

1. U.S. Pat. No. 5,500,646 A (ZRNIC), 19, Mar. 1996 Simultaneous Differential Polymetric Measurements and Co-polar Correlation coefficient Measurement.
2. U.S. Pat. No. 6,803,875 (Alford, & al), 12, Oct. 2004 Simultaneous dual polarization radar system.
3. U.S. Pat. No. 6,859,163 (Alford, & al), 22, Feb. 2005 Simultaneous dual polarization radar system.
4. Vaisala patent application: Method and apparatus for calibration of horizontal and vertical channels in a dual polarized weather radar

The invention claimed is:

1. A method for simultaneous transmission of H- and V-channels in a dual polarized weather radar in which method transmitter (1) output is directed in waveguide through azimuth rotary joint (9) to one or both of duplexers (3) by polarizer (2) that splits the signal into horizontal (H) and vertical (V) components, from duplexers the H- and V-components of the signal are directed through two separate single elevation rotary joints (8) to orthomode feed (7) and directed to atmosphere by dish reflector (6), on reception the H- and V-components are separated by the orthomode feed (7) and directed through elevation rotary joints (8) by duplexers (3) to H-channel and V-channel (4) of radar receiver and processed further by signal processor DSP (5), characterized in that the duplexers (3), polarizer (2), receivers (4) and DSP (5) are located above the azimuth rotary joint but below elevation rotary joints (8), and a low power calibration signal on the radar's operating frequency locked to the master oscillator of the radar system is taken from the signal source (10) and split into couplers (11) above the elevation rotary joints (8) and fed into receivers (4).

2. An apparatus for simultaneous transmission of H- and V-channels in a dual polarized weather radar, the apparatus comprising means for directing a transmitter (1) output in waveguide through azimuth rotary joint (9) to one or both of duplexers (3) by polarizer (2) that splits the signal into horizontal (H) and vertical (V) components, means for directing from the duplexers the H- and V-components signals through two separate single elevation rotary joints (8) to orthomode feed (7) and to atmosphere by dish reflector (6), means for separating on reception the H- and V-components by the orthomode feed (7) and directing through elevation rotary joints (8) by duplexers (3) to H-channel and V-channel (4) of radar receiver and processed further by signal processor DSP (5), characterized in that the duplexers (3), polarizer (2), receivers (4) and DSP (5) are located above the azimuth rotary joint but below elevation rotary joints (8), and a low power calibration signal on the radar's operating frequency is locked to the master oscillator of the radar system is taken from the signal source (10) and split into couplers (11) above the elevation rotary joints (8) and fed into receivers (4).

* * * * *